(12) United States Patent
Bagci et al.

(10) Patent No.: US 7,434,697 B2
(45) Date of Patent: Oct. 14, 2008

(54) DISPOSABLE, SPIN-ON FILTER

(75) Inventors: Ismail C. Bagci, Cookeville, TN (US);
Kevin C. South, Cookeville, TN (US);
Gregory W. Hoverson, Cookeville, TN
(US); Byron Andrew Pardue,
Cookeville, TN (US); **William
Haberkamp, Cookeville, TN (US); Yves
Ruellou, Fouesnant (FR); Roger
Bernard**, Quimper (FR)

(73) Assignee: Fleetguard Inc., Nashville, TN (US)

( * ) Notice: Subject to any disclaimer, the term of this patent is extended or adjusted under 35 U.S.C. 154(b) by 4 days.

(21) Appl. No.: 10/778,694

(22) Filed: Feb. 16, 2004

(65) Prior Publication Data

US 2005/0178717 A1    Aug. 18, 2005

(51) Int. Cl.
*B01D 35/30* (2006.01)
(52) U.S. Cl. .................. 210/441; 210/232; 210/440; 210/442; 210/450; 210/DIG. 17
(58) Field of Classification Search ............... 210/232, 210/238, 440, 441, 442, 443, 450, 457, DIG. 17
See application file for complete search history.

(56) References Cited

U.S. PATENT DOCUMENTS

| | | | |
|---|---|---|---|
| 2,642,186 A * | 6/1953 | Garland et al. ............. 210/357 |
| 4,021,342 A | 5/1977 | Schacht et al. |
| 4,599,170 A | 7/1986 | Friedman et al. ............ 210/232 |
| 4,863,599 A * | 9/1989 | Guenther et al. ............ 210/248 |
| 4,933,093 A | 6/1990 | Keller ..................... 210/774 |
| 5,035,797 A | 7/1991 | Janik |
| 5,080,787 A | 1/1992 | Brown et al. |
| 5,084,162 A | 1/1992 | Conti |
| 5,104,537 A | 4/1992 | Stifelman et al. .......... 210/440 |
| 5,114,572 A | 5/1992 | Hunter et al. |
| 5,118,417 A * | 6/1992 | Deibel ....................... 210/232 |
| 5,128,034 A | 7/1992 | Kool |
| 5,171,430 A | 12/1992 | Beach et al. |
| 5,182,015 A | 1/1993 | Lee |
| 5,258,118 A | 11/1993 | Gouritin et al. ............. 210/206 |
| 5,342,519 A | 8/1994 | Friedmann et al. |
| 5,462,658 A | 10/1995 | Sem ........................ 210/172 |
| 5,549,821 A * | 8/1996 | Bounnakhom et al. ...... 210/232 |
| 5,653,871 A | 8/1997 | Thomsen |
| 5,667,678 A | 9/1997 | Dye et al. |
| 5,681,461 A | 10/1997 | Gullett et al. |
| 5,695,636 A | 12/1997 | Gullett |
| 5,762,788 A | 6/1998 | Gullett |
| 5,868,932 A | 2/1999 | Guichaoua et al. ......... 210/440 |
| 6,024,229 A * | 2/2000 | Ayers ...................... 210/443 |

(Continued)

*Primary Examiner*—John Kim
(74) *Attorney, Agent, or Firm*—Krieg DeVault LLP (57) ABSTRACT

A disposable, spin-on fluid filter is constructed and arranged to mount onto a base that is configured with a threaded mounting shaft. The base provides a fluid inlet flow to the filter and a fluid exit path from the filter. The filter construction includes a housing canister having a closed end and an opposite, open end and a fluid filtering media positioned within the housing canister. A mounting post is formed as part of the closed first end of the housing canister. The mounting post is constructed and arranged for assembly to the threaded mounting shaft of the base. The design focuses on the elimination of any nutplate and on repositioning the location where the fluid filter is connected to the head to the closed end of the canister.

23 Claims, 6 Drawing Sheets

U.S. PATENT DOCUMENTS

| | | |
|---|---|---|
| 6,073,937 A | 6/2000 | Stevens et al. |
| 6,533,931 B1 | 3/2003 | Reid |
| 6,635,175 B2 | 10/2003 | Stankowski |
| 6,679,990 B2 * | 1/2004 | Reinhart .................. 210/232 |
| 6,752,924 B2 | 6/2004 | Gustafson et al. |
| 6,837,993 B2 | 1/2005 | Clausen et al. |
| 2001/0037969 A1 | 11/2001 | Stankowski |
| 2002/0170279 A1 | 11/2002 | Gustafson et al. |
| 2002/0185454 A1 | 12/2002 | Beard et al. |

* cited by examiner

DISPOSABLE, SPIN-ON FILTER

BACKGROUND OF THE INVENTION

The present invention relates in general to fluid filters and the selected design for connecting the filter to a mounting base or head. More specifically, the present invention relates to a spin-on filter that is constructed and arranged without using a nutplate for connecting the filter to a mounting base or head. By eliminating the nutplate, the resultant fluid filter is less expensive to fabricate, including cost savings by eliminating one of the component parts. A related benefit is the ability to have a mostly non-metallic construction for the fluid filter that in turn allows it to be considered "disposable" since it can be incinerated for disposal or recycled. By providing a construction that is incineratable, the structural mass of the filter can be reduced to low volume ash and this limits what will be added to landfills. The other option for "disposal" is to recycle the plastics used in the construction. Presently, when there is an all-plastic construction for the filter, it is generally described as having an "environmentally friendly green design".

Typical spin-on fluid filters according to prior art designs are mounted to the head (spud) by the use of an internally-threaded metal nutplate. The nutplate is anchored to the fluid filter canister and includes at least one flow inlet and a flow exit cooperating with a centertube. The filter-to-head mounting includes a seal to prevent leakage between the head and the filter. Flow to the filter travels by way of the head and, once it is filtered, the fluid exits by way of the head. In order to fabricate a fluid filter using a nutplate, there are costs associated with the fabrication of the nutplate and costs associated with assembly of the nutplate into the fluid filter. If the nutplate could be eliminated from the fluid filter, these costs would be saved. While there may be, on a limited basis, other techniques used for connecting a fluid filter to a mounting head, one focus of the present invention is on the elimination of any nutplate from the fluid filter and thereby precluding use of a nutplate for connection to the head.

The present invention provides a fluid filter design that is capable of spin-on, threaded mounting to a head without using a nutplate. Instead, for the present invention, a threaded post is configured as part of the closed end of the canister and connects to a shaft (internally-threaded) that extends beyond the head into the spin-on filter. As will be described herein, the present invention includes various alternative embodiments. These embodiments include, among other features, fixing the shaft as part of the fluid filter, and connecting the shaft to a cooperating portion of the head. It should also be understood that the use of "spin-on" to describe the fluid filter of the present invention is intended to include not only threaded engagement, but other connection techniques, such as the use of a bayonet connection between the fluid filter and the mounting head. Related to a bayonet connection are quarter-turn and half-turn connections that may assume a variety of structural forms.

A typical prior art mounting head includes an externally-threaded post or portion that is received by the internally-threaded nutplate. For the preferred embodiment of the present invention, the design of the mounting head is changed and includes the internally-threaded shaft that extends axially all the way to the closed end of the canister so as to connect to the threaded post. Thus, for the present invention, not only does the spin-on filter design changed from the prior art, but the head design also changes.

SUMMARY OF THE INVENTION

A disposable, spin-on fluid filter constructed and arranged to mount onto a head that is configured with a threaded mounting shaft according to one embodiment of the present invention comprises a housing canister having a closed first end and an opposite, open second end, a fluid filtering media positioned in the housing canister, and a mounting post formed as part of the closed first end of the housing canister and being constructed and arranged for assembly to the threaded mounting shaft of the head, wherein the fluid filter is free of any nutplate and free of any nutplate mounting to the head.

One object of the present invention is to provide an improved disposable, spin-on fluid filter.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
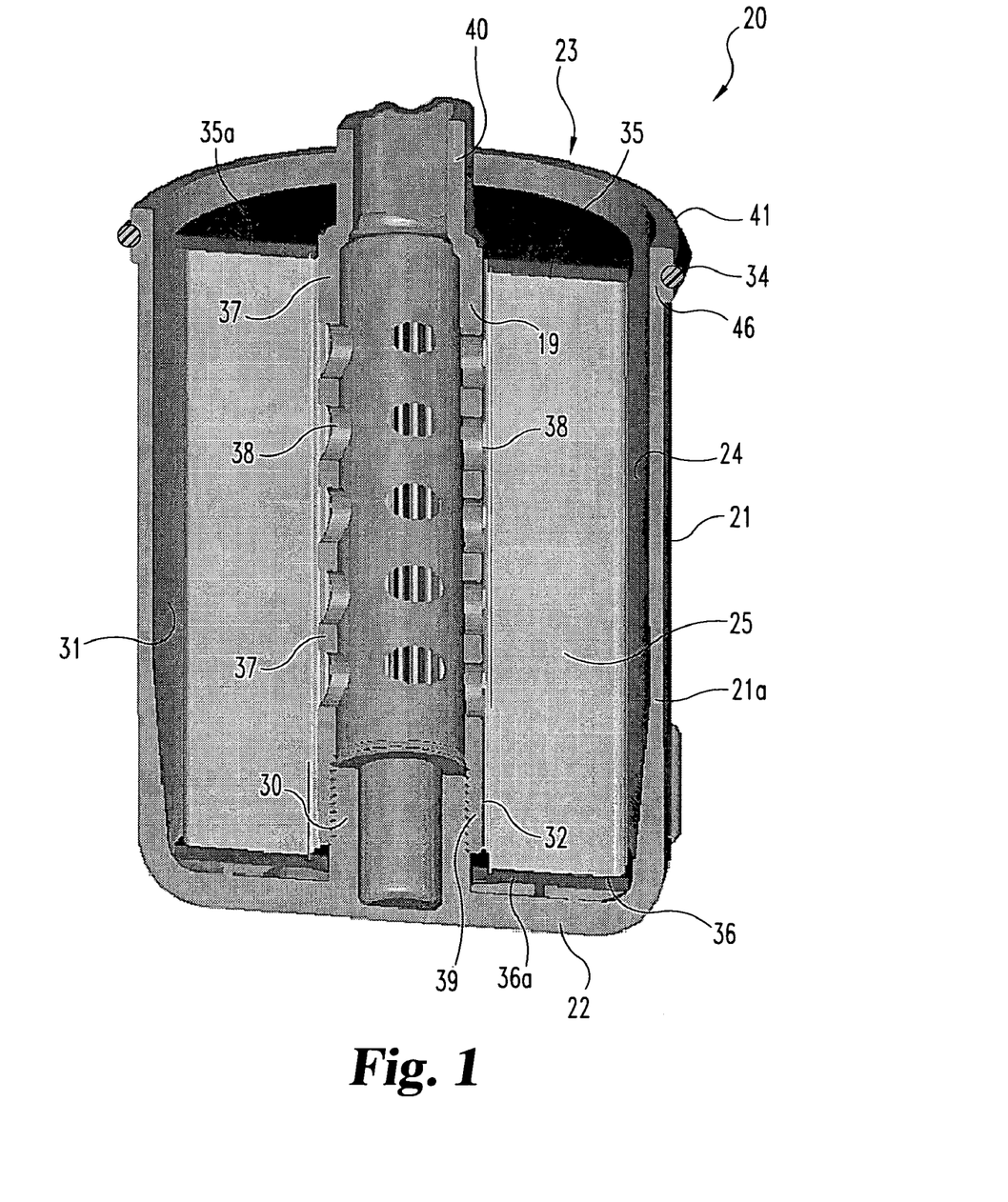
FIG. 1 is a perspective view, in full section, of a disposable, spin-on filter according to one embodiment of the present invention.

Referring to FIG. 1, there is illustrated a fluid filter 20 according to the present invention and a threaded shaft portion 19 of a mounting head. Filter 20 is constructed and arranged as a disposable, spin-on filter that includes an outer housing formed as a generally cylindrical canister 21 with a closed first end 22 and an open second end 23. The canister 21 defines a generally cylindrical interior space 24 that receives a suitable filtering media 25. The selected filtering media is either embedded into the closed first end 22 of the canister 21 or is configured as part of a press-fit cartridge. Either one of these two configurations for the filtering media is compatible with and suitable for the present invention, without the need to change the primary focus or structure of the present invention depending on which configuration is used. The focus of the present invention is directed to the elimination of the typical nutplate and the reconfiguring of the connection between the fluid filter 20 and the mounting head 29 (see FIG. 2). The filtering media 25 is included as a component part of the fluid filter 20. Additionally, the closed first end 22 includes a hollow, externally-threaded post 30 that is preferably in unitary construction with the remainder of canister 21. Another feature of the present invention is the predominantly all-plastic construction that allows the fluid filter 20 to be disposable in the context of what would be considered environmentally friendly as a "green" filter construction. Unless a spring is utilized as part of fluid filter 20, the elimination of the nutplate (normally metal) permits an all-plastic construction for fluid filter 20.

Externally-threaded post 30 is centered on closed end 22 and is concentric with the cylindrical sidewall 21a of canister 21. The filtering media 25, regardless of its selected configuration and assembly, is generally cylindrical and spaced inwardly from the canister 21 so as to provide an annular flow space 31 that is exterior to the filtering media 25. The interior of the filtering media 25 is hollow and this provides a tubular clearance space 32 for receipt of post 30 and for receipt of shaft portion 19. It should be noted that shaft portion 19 is part of the mounting head 29 and represents a significant change to the typical head design due to its extended length. As will be described herein, this extended length for shaft portion 19 allows it to extend from the mounting head axially into the fluid filter 20 downwardly to a point of connection that is adjacent the closed end of the canister 21, as illustrated in FIG. 1.

The top surface 35 and bottom surface 36 of the filtering media 25 are preferably sealed closed by the use of endplates 35a and 36a, respectively. This closing by endplates 35a and 36a may be accomplished by the use of a potting compound or by embedding the top and bottom surfaces of the filtering media 25 into the endplates. With the ends of the filtering media closed, the fluid entering from the mounting head 29 must flow to the outside of the filtering media and then flow through the filtering media 25 from the exterior to the interior, starting with the flow space 31. The flow reaching the interior of the filtering media passes into shaft portion 19 and flows upwardly in the direction of the open second end 23. The elimination of the typical nutplate creates an open flow design and the outer edge of the canister 21 must be sealed to the head to prevent fluid leakage at that interface location.

Figure 2:
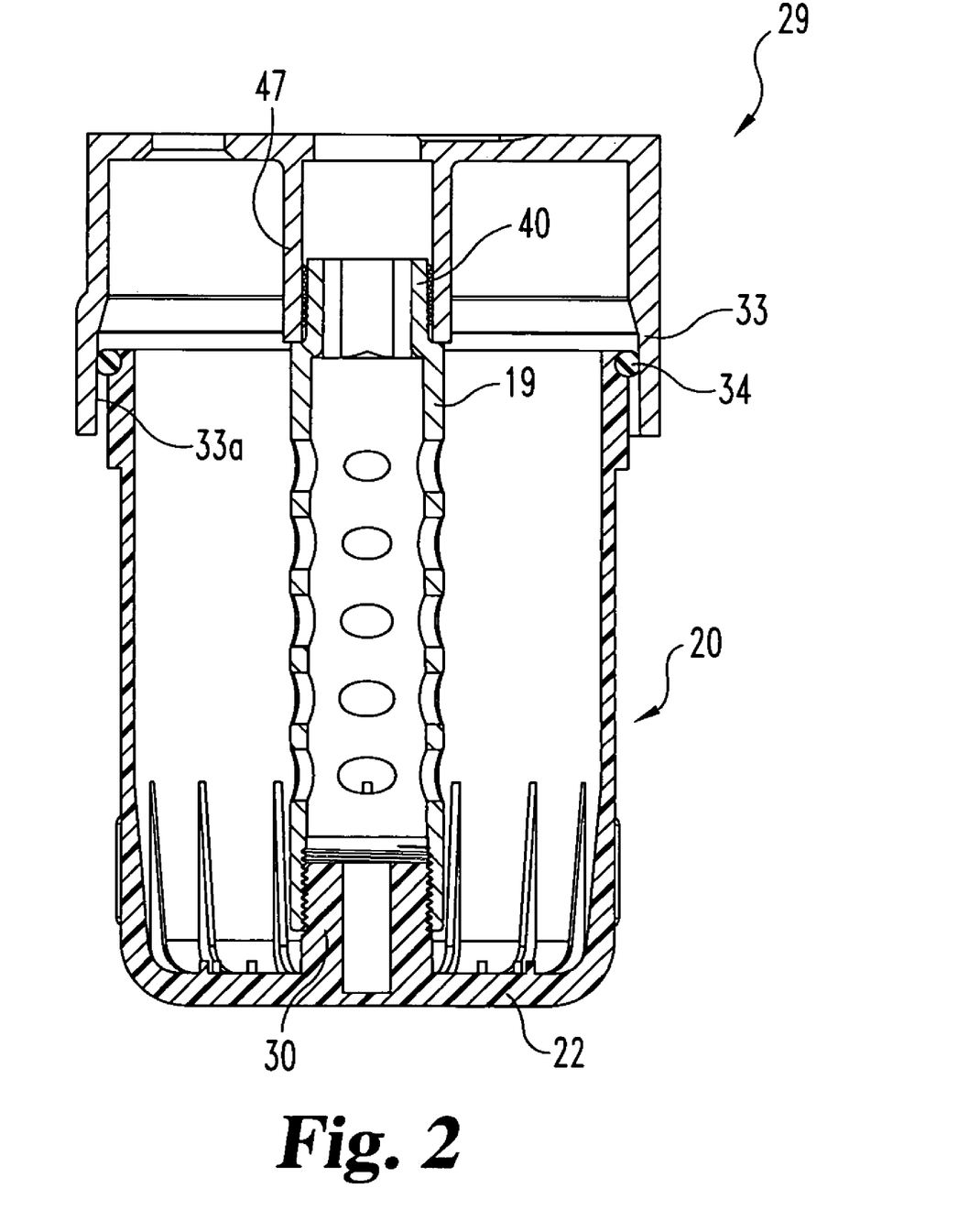
FIG. 2 is a front elevational view, in full section, of the FIG. 1 filter as mounted onto a mounting head according to the present invention.

In the FIG. 2 illustration that shows the connection between fluid filter 20 and the mounting head 29, it will be seen that the annular sidewall 33 of head 29 encircles the open second end 23 of fluid filter 20 so as to capture the annular radial seal 34. Seal 34 is preferably a nitrile rubber O-ring. As will be described, as the fluid filter 20 is connected to head 29, the sidewall 33 slides over seal 34 such that seal 34 is compressed radially between the wall of the canister 21 and sidewall 33 in order to effect an annular radial seal at that location. The connection of the fluid filter 20 to head 29 and the compression of seal 34 is facilitated by having a slight taper on the inwardly facing surface 33a of sidewall 33.

With continued reference to FIG. 1, shaft portion 19 is a hollow, tubular member having a generally cylindrical sidewall 37 that defines a plurality of flow openings 38. Lower end 39 of shaft portion 19 is positioned adjacent closed end 22 and is internally threaded for connection to externally-threaded post 30. The opposite upper end 40 of shaft portion 19 is illustrated as having a fragmentary edge and this is to denote that, in this embodiment, shaft portion 19 is part of the mounting head 29 (see FIG. 2). When a nutplate is used, the location of connection to the head is normally adjacent the open end of the canister. The elimination of the nutplate as part of the present invention and the redesign of the mounting head 29 and of the fluid filter 20 places the connection location adjacent the closed end of the canister. This connection location between the mounting head and the fluid filter is where the internally-threaded lower end 39 attaches to the externally-threaded post 30. While not the preferred embodiment, it is acceptable as a design alternative to enlarge the size of post 30 so that it can be internally threaded. This then requires that the connecting end of the shaft portion 19 be externally threaded.

Fluid filter 20 is constructed and arranged as a disposable filter that does not require nor utilize a nutplate for its attachment to the mounting head. In the context of the present invention, the concept of "disposable" means that the selected materials can be incinerated so as to reduce the structural mass into a smaller volume of ash. The disposal of fluid filter 20 in this manner requires that a small volume of ash be disposed of rather than the much larger structural filter. This substantially lessens the burden on landfills. The term "disposable" can also be used in the context of the selected materials, i.e., plastics, being recyclable.

The preferred materials for fluid filter 20 include nylon 6/6, glass-filled for canister 21 and cellulose for filtering media 25. If endcaps are used for closing off the ends of the media, suitable materials include nylon. With the use of plastic (nylon) endcaps, the concept of being "embedded" can be achieved by heating of the plastic and forcing the end of the filtering media 25 into the softened plastic. Embedding the filter media 25 into the canister can be achieved by heating the plastic at the closed first end 22 of the canister 21. All of these materials can be incinerated so as to reduce the structural volume to a smaller volume of ash. The all-plastic construction or at least predominantly all-plastic construction for fluid filter 20 means that the fluid filter is recyclable and is environmentally friendly as a "green" filter.

In order to securely and properly mount fluid filter 20 to the mounting head 29, the locations of contact between fluid filter 20 and mounting head 29 must be sealed in order to prevent fluid leakage. This includes providing some structure in the vicinity of circular upper edge 41 of canister 21 for sealing against the mounting head 29. In the preferred embodiment, this sealing function is performed by radial seal 34 and the overlapping design of sidewall 33. It is also important that there be a clearance space between the closed top surface 35 of filtering media 25 (including endplate 35a) and the mounting head 29. In this way, the incoming fluid flow by way of the mounting base is able to flow across the top endplate 35a into annular flow space 31 adjacent the open exterior of filtering media 25. The fluid flows from the outside in through the filtering media 25. Since both top surface 35 and bottom surface 36 are sealed closed, all entering flow must pass to the hollow interior of the filtering media and, at that point, it flows into shaft portion 19 by way of flow openings 38. Since post 30 is closed, the flow entering shaft portion 19 must pass upwardly and exits by way of end 40.

When the filtering media 25 is configured as a cartridge, it is constructed and arranged to press fit into the canister. In this embodiment, the top surface 35 and bottom surface 36 are sealed closed prior to installation by the use of endplates 35a and 36a, respectively. One option for closing the media ends (35 and 36) with endplates is to embed the media directly into the plastic endplates. This requires heating the endplates to soften the plastic. Another option is to bond the endplates to the ends of the media by a hot melt process or by the use of plastisol. When the filtering media is configured to be embedded into the canister 21, the top surface is sealed closed before installation and the bottom surface is pressed into the heated and softened plastic of the closed first end 22. For a press-fit cartridge design for fluid filter 20, the open ends of the media are closed, preferably by the use of endplates 35a and 35b. The endplates 35a and 35b each have an annular ring shape with an outside diameter edge and an inside diameter opening. By controlling the size of the inside diameter opening of endplate 36a, a press-fit assembly onto post 30 can be established. The portion of post 30 immediately adjacent base 22 is slightly larger in outside diameter size relative to the externally-threaded portion and this facilitates the easy assembly of the filtering media 25 onto post 30 with an interference press fit. When the fluid filter 20 is mounted onto head 29, shaft portion 19, which may have a very slight taper (smaller at end 39), slides through filtering media 25 until threaded end 39 engages post 30. Once full threaded engagement is achieved, the inside diameter opening of endplate 35 establishes an interference press fit against the outer surface of sidewall 37.

Since an important feature of the present invention is the elimination of the nutplate, it will be noted that the mounting of the fluid filter 20 to the mounting head 29 involves only the threaded assembly of shaft portion 19 (lower end 39) onto post 30. As such, there are no structural elements or features as part of fluid filter 20 positioned between the closed top surface 35 and the mounting head 29, except for the shaft portion 19 and the upper portion 46 of the canister 21 that includes upper edge 41 and any seal that might be used. What results is a low-cost fluid filter with a relatively simple design, involving a minimal number of component parts. This reduces the component cost and the fabrication cost. By selection of suitable materials, the disclosed fluid filter 20 is disposable by incineration or recycling and is therefore environmentally friendly.

One perceived benefit of designing the connection location adjacent the closed first end 22 is the lessening of any cantilever effect for the fluid filter 20. When the threaded connection location is adjacent the canister abutment to the mounting head (by way of a nutplate), the majority of the fluid filter axial length is cantilevered. As such, any vibration loading on the fluid filter 20 could be an issue relative to maintaining the sealing around the open end of the canister. By designing the mounting head 29 and the fluid filter 20 for a connection location between the two adjacent the closed end of the canister, the fluid filter 20 is securely captured at opposite ends. At the closed end of the canister, there is support of the fluid filter 20 by the threaded connection to shaft portion 19. At the open end of the canister, upper edge 41 is drawn and clamped against the surface of the mounting head 29 and this creates a frictional hold. While this is not a point of connection, it does help to support the weight of the fluid filter. As such, there is less cantilever loading on the sealed interface between the canister 21 and the mounting head 29.

Notwithstanding the foregoing force analysis, one design option for the present invention is to configure shaft portion 19 as a centertube or standpipe and design end 40 as a threaded free end of the centertube. This is illustrated in FIG. 2 where end 40 is externally threaded and head bore 47 is internally threaded. This alternate embodiment would create a fluid filter as illustrated in FIG. 1 with the shaft portion 19 becoming a pre-assembled, centertube part of the fluid filter 20. The connection of the centertube 19 into or onto the canister 21 is still by means of post 30. The actual connection of lower end 39 to post 30 can be effected by threaded engagement with post 30 being either externally threaded or internally threaded. As yet another connection option, it is envisioned that as part of this alternate embodiment, post 30 and centertube 19 can be spin welded together. With free end 40 being threaded, either internally or externally, it is designed to connect to a cooperating portion of the mounting head, either bore 47 or some other threaded portion. For example, it is envisioned that a relatively short threaded spud could be provided as part of the mounting head 29 for connecting free end 40 such that the fluid filter is securely mounted to the head, including the abutment and sealing of canister edge 41 against the mounting head 29. This sealing can be achieved by the use of a radial seal or by the use of a face seal. These design variations and alternative embodiments, as well as others, are described more fully hereinafter.

Figure 3:
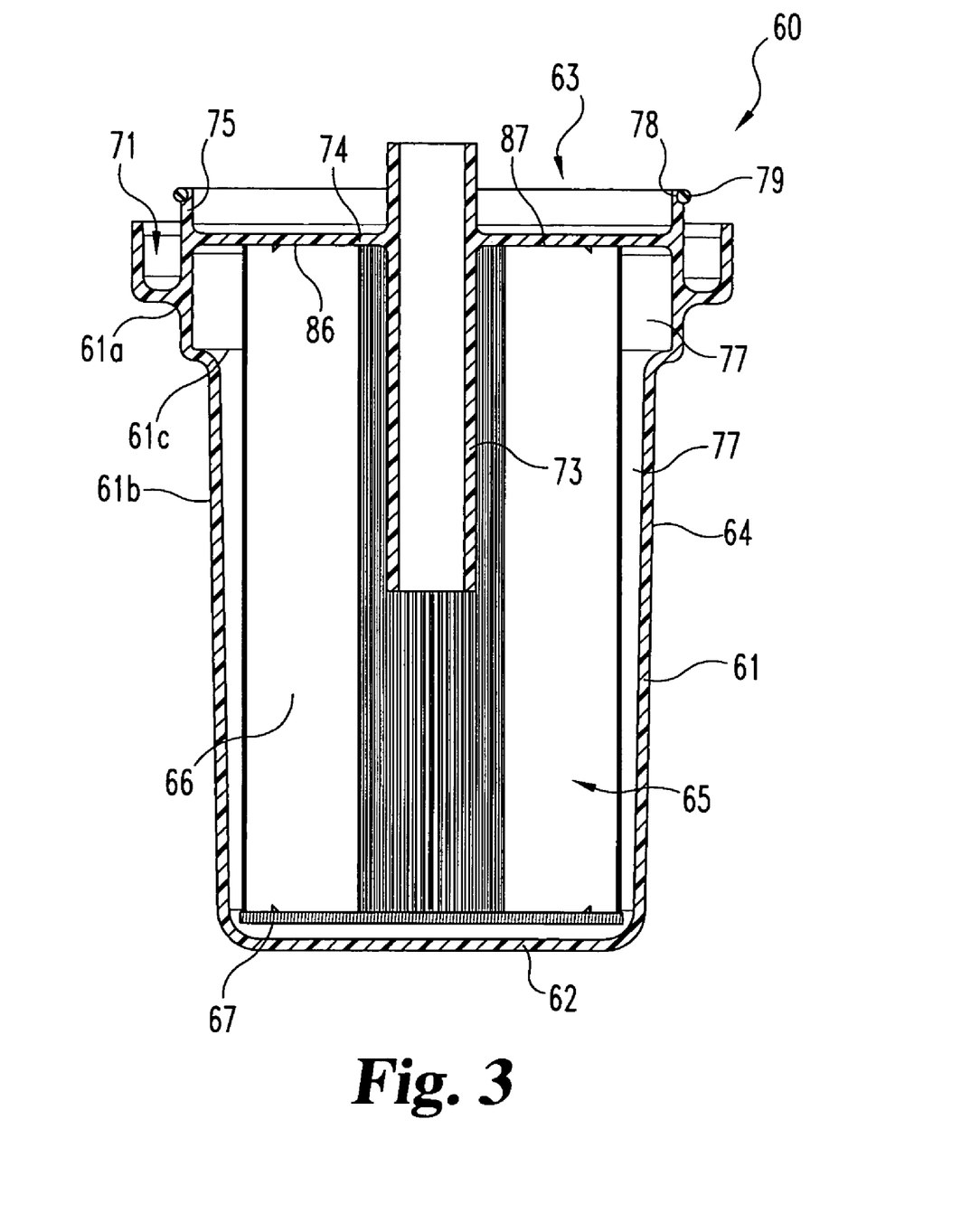
FIG. 3 is a front elevational view, in full section, of a disposable, spin-on filter according to another embodiment of the present invention.

Referring to FIG. 3, there is illustrated a fluid filter 60 according to another embodiment of the present invention. Fluid filter 60 includes a molded plastic canister 61 having a closed end or base 62, an open end 63, and an annular sidewall 64. The canister 61 is fabricated by spin welding together a top portion 61a and a bottom portion 61b. The spin weld location between portions 61a and 61b is along line 61c. Also comprising part of fluid filter 60 is filter media cartridge 65 that includes media 66 and endplate 67.

Figure 4:
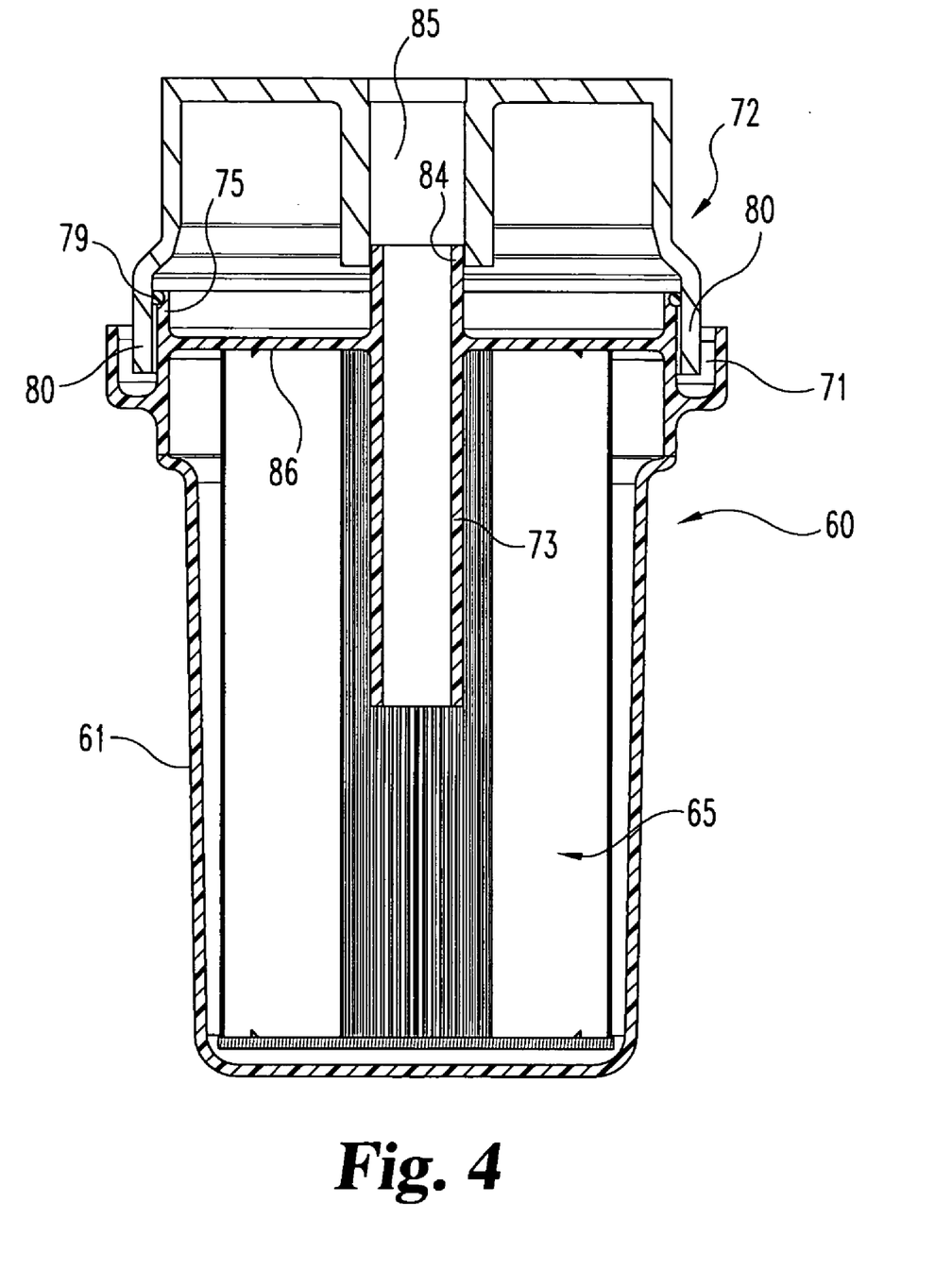
FIG. 4 is a front elevational view, in full section, of the FIG. 3 filter as mounted onto a mounting head according to the present invention.
Figure 5:
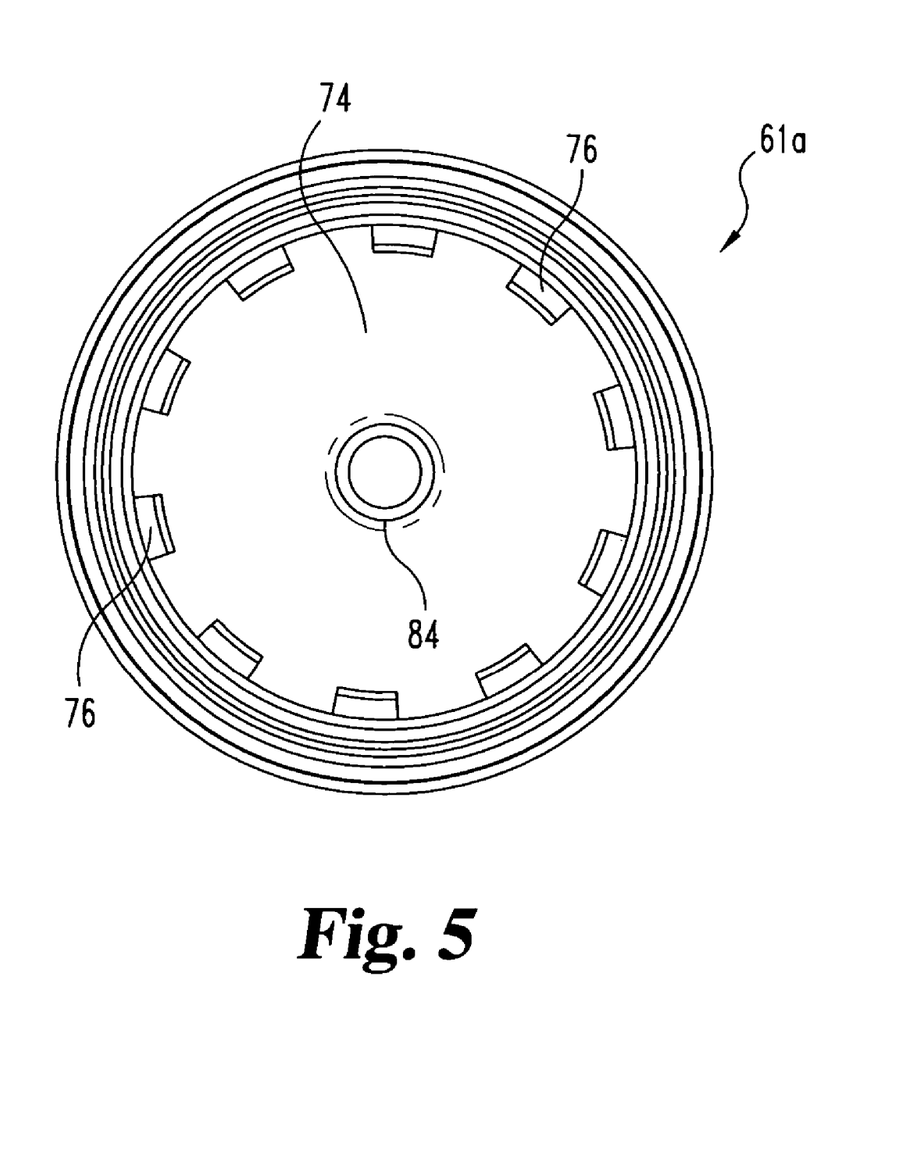
FIG. 5 is top plan view of an upper portion of the FIG. 3 filter according to the present invention.

Top portion 61a of canister 61 is a unitary, molded plastic component that includes an annular, U-channel 71 that is constructed and arranged with a connection structure for connecting to mounting head 72 (see FIG. 4). In the preferred embodiment for FIGS. 3 and 4, the connection structure is a bayonet connection allowing a secure connection between the fluid filter 60 and the mounting head 72 with a simple quarter-turn or a half-turn arrangement. The unitary top portion 61a further includes a centertube 73 and a flow control shelf 74 extending between inner wall 75 and centertube 73. Shelf 74 includes a series of spaced-apart flow openings 76 (see FIG. 5) for routing incoming fluid into annular clearance space 77 that surrounds cartridge 65. These flow openings are positioned radially outwardly beyond the outer surface of cartridge 65 so as to permit fluid flow into the cartridge.

The upper edge 78 of inner wall 75 is shaped to receive a radial seal 79 in the form of a rubber O-ring. When head 72 and fluid filter 60 are connected by the bayonet connection of wall 80 into channel 71, the radial seal 79 is compressed between wall 75 and wall 80. When this quarter-turn or half-turn connection is made, the upper end 84 of centertube 73 makes a telescoping fit into head bore 85. This telescoping fit is at a minimum a sliding fit and preferably the fit is a slight interference fit. One design reality of using plastic for centertube 73 and metal for head 72 are the difference coefficients of thermal expansion and the different material masses. Under this particular arrangement, as illustrated, the plastic of the centertube 73 expands due to heat from the head 72 and this helps to seal the centertube into bore 85 as the plastic expands. Fluid entering the interior of cartridge 65 is directed up through centertube 73 and exits by way of bore 85 in head 72.

The upper end 86 of cartridge 65 is embedded into the inwardly facing surface 87 of flow control shelf 74. This is accomplished by heating the plastic and once the surface layer of material is sufficiently softened, the end of the filter media 66 is forced into the plastic. This results in a top portion 61a subassembly comprising the top portion 61a and the filter cartridge. The cartridge 65 is then inserted into the bottom portion 61b as the top and bottom portions are joined together and then spin welded to complete the fabrication of the canister. The spin welding of the top and bottom portions creates an integral canister 61.

Figure 6:
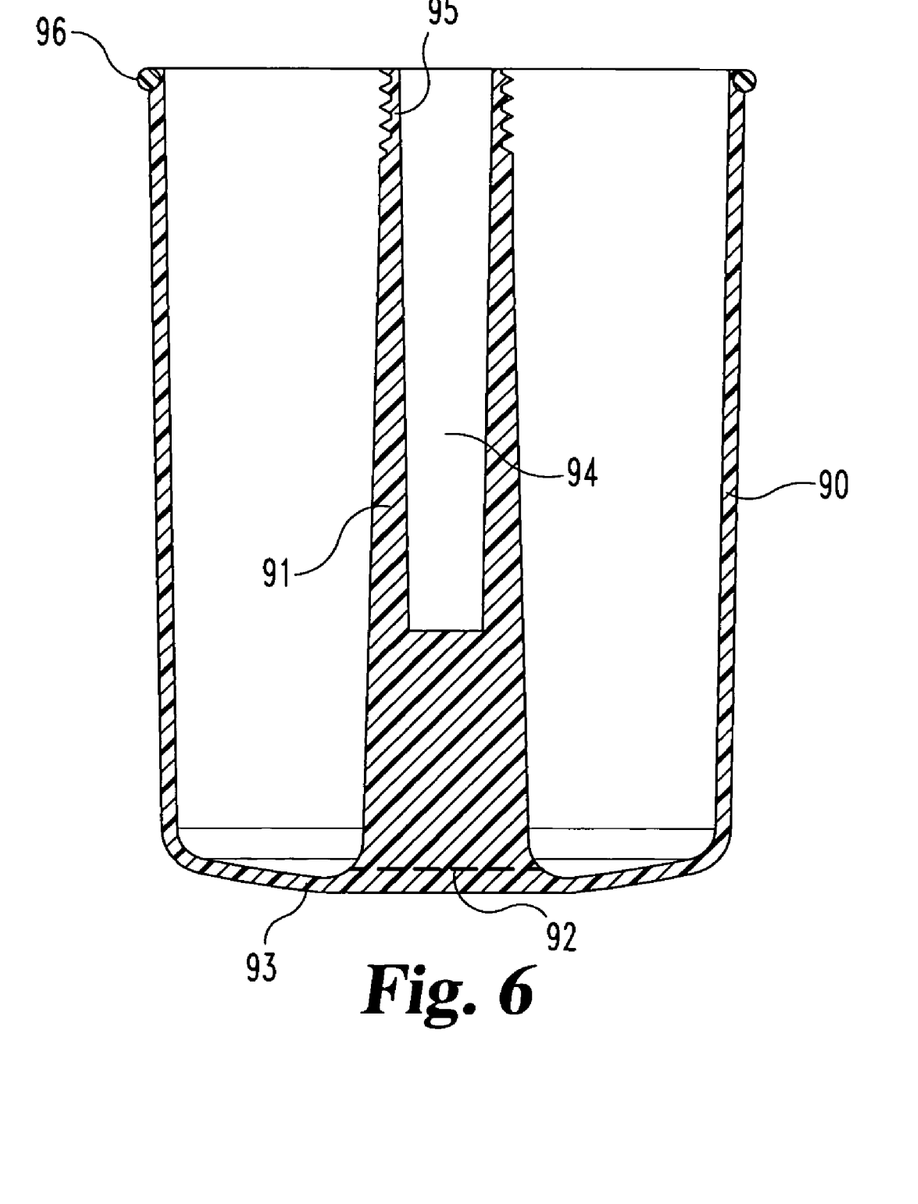
FIG. 6 is a front elevational view, in full section, of a disposable, spin-on filter according to yet another embodiment of the present invention.

Referring now to FIG. 6, another alternative embodiment for the filter canister/centertube of the present invention is illustrated. In this embodiment, a canister 90 is connected to a centertube 91. While the dividing line 92 between these two component parts is illustrated as being immediately adjacent to the closed space 93 of canister 90, the precise location for this connection interface can vary. It is preferable to position this connection interface close to base 93. A couple of options for this connection include threaded engagement and being insert molded. For the threaded engagement, the base 93 of canister 90 is internally-threaded and the lower end of center tube 91 is externally-threaded.

Another design consideration is the selection of materials. Since canister 90 does not require the same strength as centertube 91, nylon can be used for the canister and this provides a cost savings over the use of stronger, and more expensive, plastics. However, greater material strength is desired for the centertube and a higher rated plastic is preferred.

The interior 91 of centertube 90 (above the connection location) is hollow and the upper end 95 is externally threaded. An alternative is to internally-thread end 95, but the preferred connection to the head (not illustrated) is with end 95 being externally-threaded. This design fixes the centertube as a part of the fluid filter and causes the fluid filter to connect to a mounting head by the use of threaded end 95. The mounting head is cooperatively styled to connect to end 95 while fitting against radial seal 96, as previously described relative to FIG. 2.

Generally speaking with regard to the present invention, and notwithstanding what has already been described with regard to the various embodiments of FIGS. 1-6, a still further series of design variations and alternatives are contemplated as part of the present invention. Generally speaking, each of these embodiments and alternatives function with the same basic set of structural components or subassemblies including a mounting head such as head 29, a shaft portion or centertube such as shaft portion 19, and a fluid filter or filter cartridge such as fluid filter 20. In order to create an operable embodiment, these three components need to be present and connected in a cooperative fashion. In the first embodiment of FIGS. 1 and 2, the shaft portion 19 is securely and rigidly assembled as part of the mounting head 29 and is designed to remain a part of head 29 such that it is not replaced when the fuel filter is replaced. In this embodiment, the material for shaft portion 19 can be either plastic or metal. Since fluid filter 20 is designed as a disposable, spin-on filter, its construction is preferably all plastic. However, in any embodiment where the shaft portion 19 remains a part of the mounting head 29, its design and construction permits the use of metal.

When the shaft portion 19 is to be securely and rigidly connected to or assembled as part of the mounting head 29, various fabrication techniques are suitable for this purpose. The shaft portion 19 can be fabricated as part of the mounting head by welding, by casting, by a threaded assembly, by an interference press-fit, by the use of an adhesive, or by styling the shaft portion 19 in such a way that it can be attached to the head by threaded fasteners. It should be relatively clear to one of ordinary skill in the art as to which of these techniques are suitable for a metal shaft portion and which ones are suitable for a plastic shaft portion.

As an alternative embodiment of the present invention, it is envisioned that shaft portion 19 will be designed, as part of the fluid filter 20, similar to a centertube or standpipe. Since the fluid filter 20 is intended to be a disposable, spin-on filter, with or without the shaft portion being a component part thereof, when the shaft portion is a part of the fluid filter 20, it should be molded out of plastic to retain the "disposable" status. In order to mount this fluid filter style to head 29, end 40 is preferably threaded, as described, and while these threads may be either internal or external, the preferred connection is to use external threads on end 40. This has been generally described in the context of FIG. 1 and specifically illustrated in FIG. 2. While this particular embodiment or alternative might be considered similar to how a nutplate attaches to the head, in the FIG. 2 design, the shaft portion 19, when used as a "centertube", has its threaded end 40 extending beyond the open end of canister 21 and this design may require a modification to the mounting head 29. As illustrated in FIG. 2, a receiving bore in the mounting head 29 cooperates with upper end 40 and this cooperation may be by means of a threaded fit.

Although the shaft portion 19, now described as a centertube, can be connected to post 30 by a threaded connection, as illustrated in FIG. 1, other connection or assembly techniques are contemplated as part of the present invention, including restyling of the canister and the centertube, as illustrated in FIGS. 3-6. As described, the lower end 39 of centertube 19 can be spin welded to post 30 as one way to provide a secure connection of the centertube to the fluid filter. For a spin welded connection, neither end 39 nor post 30 needs to be threaded. Another option is to rigidly and securely connect end 39 to post 30 by means of an adhesive. A still further design option is to mold the centertube as a unitary portion of the molded canister. This can also be done by insert molding. A molding technique could preclude the need for any type of post 30 and allow the centertube 19 and base 22 to be molded out of plastic as a unitary combination.

While the shaft portion 19 or centertube 19 is preferably designed as a fixed part of the mounting head 29 or as a fixed part of the fluid filter 20, the same structure can be either, or both, or neither. This is achieved by using post 30 and the described threaded connection to end 39 and by threading end 40 for threaded connection to the mounting head. In other words, the shaft portion/centertube 19 is threaded at both ends for connection. If one threaded connection is made fixed by the addition of adhesive to the mating threads, then that dictates the design choice. For example, adding adhesive to the connection by way of end 40 fixes the shaft portion 19 as an integral part of the mounting head 29. Alternatively, by adding adhesive to the connection by way of lower end 39, this fixes the centertube 19 as an integral part of the fluid filter 20. If both ends 39 and 40 are threaded for connection as described and neither receives adhesive or is otherwise fixed to its mating part, then the shaft portion/centertube is not an integral part of either the fluid filter 20 or the mounting head 29. This non-fixed design approach thus defines an assembled combination of three components including fluid filter 20, mounting head 29, and flow tube 19. In this arrangement, the flow tube 19 connects at one end to the fluid filter canister 21 and, at an opposite end, to the mounting head 29.

Importantly, none of the embodiments disclosed, described, illustrated, etc. herein include the use of a nutplate. There is also nothing in the way of a substitute component that performs in the same way as a nutplate. Accordingly, regardless of the selected non-nutplate design, at least one component part is eliminated, as compared to prior art spin-on filters. This part elimination in the form of the nutplate saves the cost of that part and the labor cost to install the part in the fluid filter assembly. Since nutplates are typically metal, the elimination of this component contributes to an all-plastic construction, thereby making the resulting fluid filter disposable by either incineration or recycling.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A disposable, spin-on fluid filter constructed and arranged to mount onto a head that is configured with a threaded mounting shaft, the head providing a fluid inlet flow to the fluid filter and a fluid exit path from the fluid filter, said fluid filter comprising:
   a housing canister having a closed first end free of any opening and an opposite, open second end;
   a fluid filtering media positioned in and fixedly coupled to said housing canister; and
   an externally threaded mounting post formed as part of the closed first end of said housing canister and being constructed and arranged for assembly to said threaded mounting shaft to fixedly lock together said mounting post, said mounting shaft and said housing canister free of rotation therebetween, wherein said housing canister is mounted to said head by a threaded connection between said externally threaded mounting post and said threaded mounting shaft, and wherein said fluid filter is free of any conventional, threaded nutplate.

2. The disposable, spin-on fluid filter of claim 1 wherein said open second end includes an abutment edge constructed and arranged for fluid sealing with said head.

3. The disposable, spin-on fluid filter of claim 2 wherein said housing canister is a molded unitary member including said mounting post.

4. The disposable, spin-on fluid filter of claim 3 wherein said fluid filtering media is embedded into said housing canister.

5. The disposable, spin-on fluid filter of claim 4 wherein said housing canister includes a seal constructed and arranged for cooperating with said head for sealing a canister-to-head interface.

6. The disposable, spin-on fluid filter of claim 1 wherein said housing canister includes a seal constructed and arranged for cooperating with said head for sealing a canister-to-head interface.

7. The disposable, spin-on fluid filter of claim 6 wherein said housing canister is a molded unitary member including said mounting post.

8. The disposable, spin-on fluid filter of claim 7 wherein said fluid filtering media is embedded into said housing canister.

9. A combination of a mounting head and a disposable, spin-on filter, comprising:
   a mounting head for a fluid filter, said mounting head including a threaded mounting shaft; and
   a disposable, spin-on fluid filter connected to said mounting head, said fluid filter comprising:
      a housing canister having a closed first end free of any central opening therethrough and an opposite, open second end;
      a fluid filtering media positioned in and fixedly attached to said housing canister; and
      a mounting post formed as part of the closed first end of said housing canister and being constructed and arranged for assembly to said threaded mounting shaft to fixedly couple said mounting post, said mounting shaft and said housing canister and prevent rotation therebetween, wherein said fluid filter is free of any nutplate;
   wherein said mounting shaft has an axial length sufficient to extend through the open second end into said fluid filter proximate the closed first end for fixedly connection to said mounting post.

10. The combination of claim 9 wherein said mounting post is externally threaded.

11. The combination of claim 10 wherein said mounting shaft includes a sidewall defining a plurality of flow openings.

12. The combination of claim 11 wherein said open second end includes an abutment edge constructed and arranged for fluid sealing against said head.

13. The combination of claim 12 wherein said housing canister is a molded unitary member including said mounting post.

14. The combination of claim 11 wherein said fluid filtering media is embedded into said housing canister by the use of a potting compound.

15. The combination of claim 14 wherein said housing canister includes a seal constructed and arranged for cooperating with said head for sealing a canister-to-head interface.

16. The combination of claim 11, wherein the mounting head further includes a body portion defining a fluid inlet and a fluid outlet such that the fluid inlet and the fluid outlet are defined opposite the mounting post.

17. The combination of claim 16, wherein the mounting shaft cooperates with the fluid outlet for routing filtered fluid from the fluid filter.

18. A combination of fluid filter and mounting head constructed and arranged for receipt of a fluid filter, the fluid filter having an open end and a closed end with an integral post, said mounting head comprising:
   a body portion defining a fluid inlet and a fluid outlet;
   a hollow mounting shaft cooperating with said fluid outlet for routing filtered fluid from said fluid filter, said mounting shaft having an axial length sufficient to extend through the open end into said fluid filter and proximate the closed end for fixedly connection to said integral post, wherein when fixedly connected there is not rotation between said hollow mounting shaft and said integral post wherein said post is threaded and said hollow mounting shaft has a free end that is threaded and constructed and arranged for connection to said post and said hollow mounting shaft includes a sidewall defining a plurality of flow openings for receipt of filtered fluid.

19. The combination of claim 18, wherein the fluid inlet and fluid outlet are defined opposite the integral post when the mounting head receives the fluid filter.

20. A spin-on fluid filter constructed and arranged to mount onto a head that is configured with a threaded mounting shaft, said spin-on fluid filter comprising:
   a unitary housing canister defining an interior space and having a closed first end free of any central opening therethrough and an opposite, open second end;
   a fluid filtering media positioned in said interior space and fixedly attached to said unitary housing canister; and
   an externally threaded mounting post unitarily formed as part of said closed first end and extending in the direction of said open second end, wherein said fluid filter is mounted to said head by a threaded connection between said externally threaded mounting post and said threaded mounting shaft, wherein said threaded mounting post, said externally threaded mounting shaft and said unitary housing canister do not rotate relative to one another when said fluid filter is mounted to said head.

21. A combination of a mounting head and a disposable, spin-on filter, comprising:
   a mounting head for a fluid filter;
   a hollow mounting shaft threadedly connected to said mounting head; and
   a spin-on fluid filter threadedly connected to said hollow mounting shaft, said spin-on fluid filter comprising:

a unitary housing canister defining an interior space and having a closed first end free of any central opening therethrough and an opposite, open second end;

a fluid filtering media positioned in said interior space and fixedly coupled to said unitary housing canister; and a threaded mounting post unitarily formed as part of said closed first end and extending in the direction of said open second end, wherein said fluid filter is mounted to said head by a threaded connection between said threaded mounting post and said threaded mounting shaft, wherein said threaded mounting post, said threaded mounting shaft and said unitary housing do not rotate relative to one another when said fluid filter is mounted to said mounting head.

22. The combination of claim 21, wherein the mounting head includes a body portion defining a fluid inlet and a fluid outlet such that the fluid inlet and the fluid outlet are defined opposite the threaded mounting post.

23. The combination of claim 22, wherein the mounting shaft cooperates with the fluid outlet for routing filtered fluid from the fluid filter.

* * * * *